Feb. 23, 1965    A. H. STALKER    3,170,714
CLOTHES PROTECTOR FOR TRUNK COMPARTMENT OF
A MOTOR VEHICLE OR THE LIKE
Filed March 25, 1963

INVENTOR
ALEXANDER H. STALKER

BY: *Frederick E. Bromley*
ATTORNEY

United States Patent Office 3,170,714
Patented Feb. 23, 1965

3,170,714
CLOTHES PROTECTOR FOR TRUNK COMPARTMENT OF A MOTOR VEHICLE OR THE LIKE
Alexander H. Stalker, 787 Coxwell Ave., Toronto 6, Ontario, Canada
Filed Mar. 25, 1963, Ser. No. 267,527
Claims priority, application Canada, Apr. 12, 1962, 846,616
2 Claims. (Cl. 280—150)

This invention relates generally to vehicle accessories and more particularly to an improved flexible protective device for use on the trunk compartment of a vehicle or the like.

In motor vehicles, especially those of recent years, the trunk compartment is generally very deep. When an individual attempts to load articles, such as parcels, luggage, etc., or to obtain access to the spare tire, tools, etc., the outer wall and rear bumper which are generally quite dusty and/or dirty, causes the individual's clothes to become soiled when they are brushed against in using the trunk.

Hence it is a general object of my invention to provide a novel clothes protector which is readily available for shielding a person's clothes from contact with mud, dirt, rain water, tar and other objectionable substances that are wont to gather on the rear end of an automobile, including the rear bumper, and soil one's clothes in the use of the trunk.

A further object of the invention is to provide a protective device of the kind described in which the attachment is effected by permanent magnets disposed along an inner edge of the device for securement to the inner surface of the rear wall of the trunk compartment. Desirably the permanent magnets are slidable along said inner edge for positional adjustment whereby, to avoid any obstruction in the nature of a projecting element on the said rear wall, such as the usual lock member of the compartment or a brace member. The detachable connection is convenient in that the protector may be readily attached without use of bolts, screws and analogous fastening means. Moreover, the detachable connection facilitates removal for the purpose of clearing the protector from time to time. Additionally, the magnetic attachment means enables the protector to be easily transferred to another motor car.

Still another object of the invention is to provide a protector of the class referred which is stored in folded condition when not in use, and the folds are arranged in a manner to keep the outer clothes-contact face clean by folding it against itself. Consequently this clothes-contact face should remain clean over a long period of time.

A still further object of the invention is to provide a protective device of the kind described which is unfolded for use and draped over the rear wall of the trunk compartment and is of a length to extend downwardly over the rear bumper. A feature of the device resides in the provision of weight means which not only causes the protector to hang properly but which is a metal member that can be secured by the permanent magnets in the folded condition of the protector to retain it in stored condition within the trunk compartment alongside the rear wall thereof where it occupies little space. Desirably tabs are supplied on the weighted edge of the protector for convenient unfolding and folding thereof.

The clothes protector comprises a flexible sheet of washable material such as a suitable plastic. Preferably the sheet is stiffened by a spaced arrangement of transverse thin strips or rigid or semi-rigid material such as hardboard, for example. The strips are attached to the sheet material. One way of affecting the attachment is to use two thicknesses of the sheet material and form transverse pockets therein by lines of sewing. The strips or slots are inserted in such pockets.

A selected embodiment of the invention is shown in the accompanying drawing, in which FIGURE 1 is a fragmentary perspective view of a trunk compartment showing the protective device of the invention in the protecting draped relation, portions being broken away for purposes of clarity;

Figure 4:
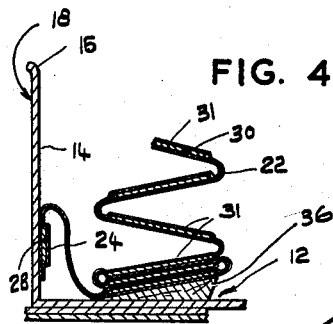
FIGURE 4 is a vertical sectional view of the trunk compartment showing the protector device in cross sectional elevation and partly folded for storage.

Referring to the drawing in detail, a fragmentary portion of a vehicle body is indicated generally at 10 and includes a relatively deep storage trunk compartment 12 conventional to automobiles and formed in part by an outer vertical wall 14 having an upper transverse edge 16.

In the use of an automobile, the outer surface 18 and upper edge 16 of the vertical trunk wall 14, as well as the adjacent bumper B, become relatively dirty and greasy and when a person has occasion to place articles in trunk compartment 12 or remove them therefrom, the clothing is subject to becoming soiled and usually does, unless one is extremely careful to avoid brushing the clothes against the portions of the vehicle referred to.

Figure 1:
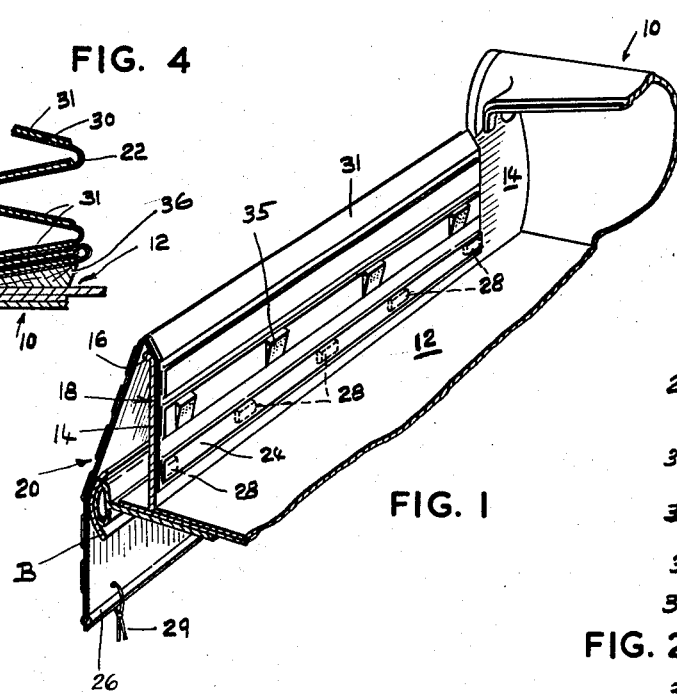
Figure 2:
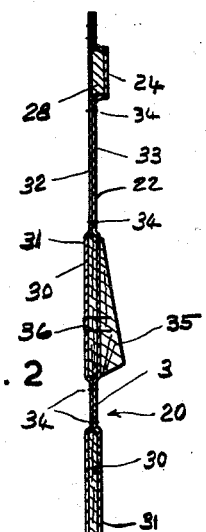
FIGURE 2 is a longitudinal sectional view on line 2—2 of FIGURE 3 with a portion broken away.
Figure 3:
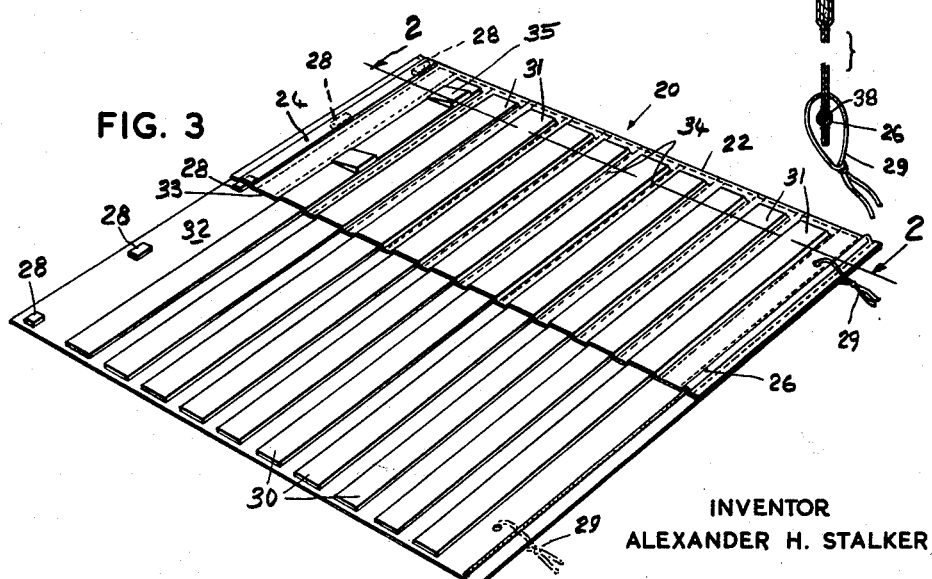
FIGURE 3 is a perspective view of the protector device spread out flat and showing one thickness of the sheet material broken away to expose the stiffeners.

The manner of using my protective device to avoid soiling one's clothes is depicted in FIGURE 1.

The protective device is shown as comprising a flexible, foldable, protective sheet 20, which includes a body member 22, which may be produced from plastic or the like which may be washed from time to time as occasion may require. The body member 22 is generally rectangular and is of a width to permit ready disposition transversely within the trunk compartment 12, adjacent to the rear wall 14 thereof and is made of a length such that it may be draped in unfolded condition over the rear wall and down the outer side thereof to a point somewhat below the bumper B.

The body member 22 has at its opposite ends tubular sleeves 24 and 26 which are shown as continuous throughout the length of the respective ends and which may be formed by heat-sealing, stitching, etc. The sleeve 24 contains a plurality of spaced, permanent magnets 28 which co-act with the inner surface of the vertical wall 14 to retain the body member 22 in the draped condition shown in FIGURE 1, and also to allow the body member to be folded as depicted in FIGURE 4. A suitable number of these magnets may be used to effect the magnetic attachment, and they may be shifted along sleeve 24 and located where most convenient, directly with respect to avoiding existing protuberances on the wall 14, such as the locking device for the trunk lid or a brace member for the wall 14. The ends of the tubular sleeve may be closed if desired and this inner end of the body member 22 will preferably be attached to the inner surface of rear wall 14 as shown in FIGURE 4, although this is not imperative to the use of the invention.

Sleeve 26 which is co-extensive with the outer edge of the body member 22 has disposed therein a metal device, such as a flexible wire rod 38 or chain, to provide weight means functioning to retain the body member 22 draped over the rear wall 14 in unfolded condition of use. When the protector device is folded in stored position within the trunk compartment, the outer edge is secured by the magnets which assist in retaining the protector device in properly folded condition. The ends of the tubular sleeve 26 may be sealed in a conventional manner. The outer edge portion of the body member 22 is supplied with tabs 29 which may be grasped by the user to facilitate unfolding and folding of the protected device. These tabs may be fashioned of cord, for example, or on the other hand, other known types of pulled tabs may be employed.

It is desirable to provide the body member 22 with transverse stiffening members 30 which are arranged in spaced parallel relation substantially throughout the length of the body member and attached thereto. These stiffeners can be made of very thin hardboard and of a width such that they may facilitate the folding of a body member in zig-zag fashion, shown in FIGURE 4, whereby the stiffened portions overly one another, and the intervening non-stiffened portions allow for flexing with a hinge-like action.

One way of attaching the slats 30 is to provide pockets in the body member 22, such as shown at 31, and these pockets can be readily formed by making the body member of two thicknesses of material indicated at 32 and 33 and stitching the two thicknesses of material as at 34 to fashion the slat receiving pockets as will be well understood in the art. The ends of the pockets may be closed in similar manner. The pockets could be formed by the heat sealing method which is conventional.

It is intended that the body member 22 will be folded with the slats overlying one another in stacked formation, with the stack device resting on the floor of the trunk compartment when the device is not in use. Acceleration and de-acceleration of the vehicle, will of course, have to displace the stacked slats of the protector device and therefore, it is believed to be desirable to support the folded protector device in a rearwardly inclined attitude which may be accomplished as by means of wedge blocks 35 shown as attached by staples 36 to the bottom slat of the stack. Modification in this respect of course, may be resorted to without departing from the spirit and scope of the invention.

It will be obvious to those skilled in the art that various changes may be made in the general construction of the protector device without departing from the spirit of the invention, and therefore, the invention is not to be construed as limited to what is shown in the drawings and described in the specification, but only by the scope of the appended claims.

What I claim is:

1. A vehicle trunk compartment including an outer, substantially vertical wall of magnetically-attractive material having an upper transverse edge, and a sheetlike protector device removably secured on an inner surface of said wall within said compartment and drapable over the upper edge and outer surface of said vertical wall, said protector device comprising a flexible, foldable body member including spaced parallel tubular sleeves at opposite transverse edges thereof, an elongated weight element disposed in one of said sleeves, and a plurality of independent, magnet elements slidably disposed in said other sleeve and removably retaining said other sleeve on the inner surface of said vertical trunk compartment wall, and at least one wedge element secured to an intermediate portion of said body member and having a surface extending angularly and disposed transversely relative to one of said tubular sleeves for aiding in folding and storing said flexible body member within said trunk compartment.

2. The structure as claimed in claim 1 in which said flexible, foldable body member includes a plurality of intermediate sleeves extending parallel to said sleeves at the transverse edges of said body member, and a relatively rigid strip element disposed in said intermediate sleeves for facilitating folding of the device in said trunk compartment and aiding in unfolding the same over the vertical wall.

References Cited by the Examiner
UNITED STATES PATENTS

| | | | |
|---|---|---|---|
| 1,922,170 | 8/33 | McGarry | 160—330 |
| 2,060,362 | 11/36 | Zurcher | 269—37 |
| 2,299,173 | 10/42 | Pidgeon | 160—349 XR |
| 2,325,992 | 8/43 | Wirthman | 160—264 |
| 2,803,493 | 8/57 | Haefliger | 160 |
| 2,919,141 | 12/59 | Hughes | 280—150 |
| 3,042,111 | 7/62 | Wytovich | 160—368 |
| 3,046,048 | 7/62 | Cheney | 160—368 |

HARRISON R. MOSELEY, *Primary Examiner.*